W. D. RINEHART.
Axle-Skeins.

No. 156,380. Patented Oct. 27, 1874.

WITNESSES
Henry N. Miller
C. L. Eure

INVENTOR
Wm. D. Rinehart,
Alexander H. Mason
Attorneys

UNITED STATES PATENT OFFICE.

WILLIAM D. RINEHART, OF ALLEGHENY, PENNSYLVANIA.

IMPROVEMENT IN AXLE-SKEINS.

Specification forming part of Letters Patent No. 156,380, dated October 27, 1874; application filed October 13, 1874.

*To all whom it may concern:*

Be it known that I, WILLIAM D. RINEHART, of Allegheny, in the county of Allegheny and State of Pennsylvania, have invented certain new and useful Improvements in Thimble-Skeins; and do hereby declare that the following is a full, clear, and exact description thereof, reference being had to the accompanying drawings and to the letters of reference marked thereon, making a part of this specification.

The nature of my invention consists in the construction and arrangement of a thimble-skein for wagon-axles, and in the device for fastening the same to the axle, as will be hereinafter more fully set forth.

In order to enable others skilled in the art to which my invention appertains to make and use the same, I will now proceed to describe its construction and operation, referring to the annexed drawing, in which—

Figure 1:
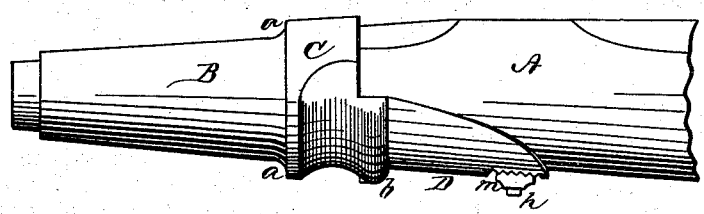
Figure 2:
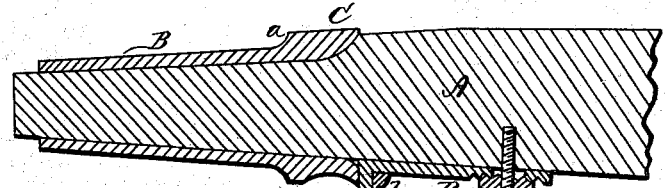
Figure 3:
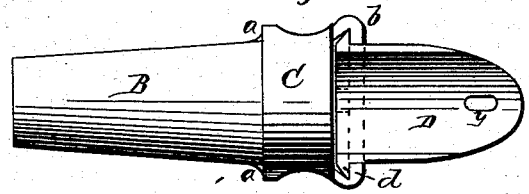
Figure 4:
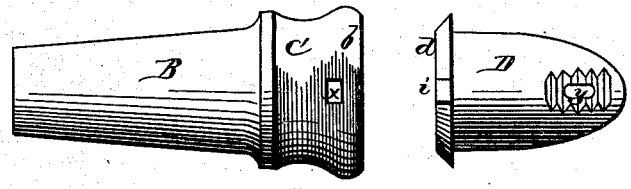

Figure 1 is a side view of an axle with my thimble-skein placed thereon. Fig. 2 is a longitudinal section of the same. Fig. 3 is a plan view of the thimble-skein; and Fig. 4 is a bottom view of the same.

A represents one end of an ordinary wooden axle, upon which is placed the thimble-skein B. This skein is made in the usual tapering manner and formed at its inner end with an enlarged band or hub, C, forming a shoulder, $a$, for the hub of the wheel to abut against. From the inner edge of the hub C, around the lower half, projects a lip, $b$, which is grooved along its inner or upper side, and has in the center an opening, $x$. D represents a curved plate to fit on the under side of the axle A. This plate is at its outer edge provided with a flange, $d$, to fit in the groove on the lip $b$, and in the center of the flange is formed the pin or lug $i$, to pass through the hole $x$ in said lip. In the inner end of the plate D is an elongated slot, $y$, for the passage of a screw, $h$, into the axle A. The outer surface of the plate D, around the slot $y$, is notched or corrugated, as shown in Figs. 2 and 4, and a washer, $m$, similarly notched or corrugated, is placed on the screw $h$ before this is passed through the slot into the axle, and when the screw is tightened the corrugated washer takes into the corrugations on the plate, thereby preventing the plate from shifting either way, and as the skein is held by the flange $d$ and its pin $i$ fitting in the grooved lip $b$, with opening $x$, the skein is also held so that it will not move either way.

When the skein works loose on the axle—which it does after the wagon has run a while—it may be tightened in the following manner: First loosen the bolt or screw $h$ sufficiently to let the washer $m$ clear the plate, then drive the skein back as far as may be required and tighten the bolt and washer again, when the skein will be properly fastened.

Having thus fully described my invention, what I claim as new, and desire to secure by Letters Patent, is—

1. The thimble-skein B, having the enlarged band C, provided with the grooved semicircular lip $b$, with hole $x$, substantially as and for the purposes set forth.

2. In combination with the thimble-skein B C, having grooved lip $b$, with hole $x$, the plate D, provided with the flange $d$, having lug $i$, substantially as and for the purposes set forth.

3. The combination of the thimble-skein B C, having grooved lip $b$, with hole $x$, the plate D, having flange $d$, with lug $i$ and elongated slot $y$, with corrugations around the same, the corrugated washer $m$ and screw $h$, all substantially as and for the purposes set forth.

In testimony that I claim the foregoing I have hereunto set my hand this 2d day of October, 1874.

WILLIAM D. RINEHART.

Witnesses:
   J. DONALDSON,
   H. A. HALL,